United States Patent
Budde et al.

(10) Patent No.: US 8,022,580 B2
(45) Date of Patent: Sep. 20, 2011

(54) PLASTICS INJECTION-MOLDING MACHINE WITH INTEGRATED, LINEAR-ROTARY DIRECT DRIVE

(75) Inventors: Thomas Budde, Würzburg (DE); Mykhaylo Toldonov, Bad Neustadt/Saale (DE)

(73) Assignee: Siemens Aktiengesellschaft, München (DE)

( * ) Notice: Subject to any disclaimer, the term of this patent is extended or adjusted under 35 U.S.C. 154(b) by 331 days.

(21) Appl. No.: 12/094,212

(22) PCT Filed: Nov. 6, 2006

(86) PCT No.: PCT/EP2006/068101
§ 371 (c)(1), (2), (4) Date: May 19, 2008

(87) PCT Pub. No.: WO2007/057313
PCT Pub. Date: May 24, 2007

(65) Prior Publication Data
US 2008/0284256 A1    Nov. 20, 2008

(30) Foreign Application Priority Data
Nov. 18, 2005 (DE) .......................... 10 2005 055 491

(51) Int. Cl.
*H02K 41/00* (2006.01)
*H02K 16/00* (2006.01)

(52) U.S. Cl. ..................... 310/12.14; 310/112; 310/266; 425/145; 425/152; 425/574

(58) Field of Classification Search ............... 310/12.13, 310/12.14, 12.15, 15, 112, 266; 425/145, 425/149, 542, 574, 582, 583, 587
See application file for complete search history.

(56) References Cited

U.S. PATENT DOCUMENTS

| 6,043,579 A * | 3/2000 | Hill ............................... 310/164 |
| 6,051,896 A * | 4/2000 | Shibuya et al. ............ 310/12.14 |
| 6,216,798 B1 * | 4/2001 | Riello et al. .................. 173/152 |
| 6,247,913 B1 * | 6/2001 | Shibuya et al. ............... 425/145 |

(Continued)

FOREIGN PATENT DOCUMENTS

JP    2004-304958    * 10/2004

(Continued)

OTHER PUBLICATIONS

Machine Translation of KR 2001-0064185, "rotary linear motor", Hyeon-Jeong Shin and Yeong-Gwan Kim—Jul. 9, 2001.*

(Continued)

*Primary Examiner* — Karl I Tamai
(74) *Attorney, Agent, or Firm* — Henry M. Feiereisen; Ursula B. Day

(57) ABSTRACT

A plastics injection-molding machine is to be equipped with a more compact drive that undergoes less wear. For this purpose, it is envisaged to integrate the direct rotational drive into the direct linear drive. Accordingly, the electric linear motor has a pot-shaped external rotor (13), in the inner space of which the main part of a hollow-cylindrical stator (16) of the linear motor is arranged and which is firmly connected to the output shaft (10). The rotary drive has a stator (18), which is mounted on the inner wall of the hollow-cylindrical stator (16) of the linear motor, and a rotor, which is firmly coupled to the output shaft (10) within the stator (18) of the rotary electric motor. This direct drive produces a very compact type of construction and it is possible to dispense with easily wearing threaded spindles.

4 Claims, 4 Drawing Sheets

U.S. PATENT DOCUMENTS

| | | | |
|---|---|---|---|
| 6,570,275 B2 * | 5/2003 | Kim et al. | 310/12.14 |
| 7,285,883 B2 * | 10/2007 | Bott et al. | 310/75 R |
| 2002/0047367 A1 | 4/2002 | Kim | |
| 2008/0284256 A1 * | 11/2008 | Budde et al. | 310/12 |
| 2009/0007698 A1 * | 1/2009 | Budde | 73/862.627 |
| 2009/0039713 A1 * | 2/2009 | Bott et al. | 310/12 |
| 2009/0160283 A1 * | 6/2009 | Bott et al. | 310/156.47 |
| 2009/0295236 A1 * | 12/2009 | Bott et al. | 310/12.14 |

FOREIGN PATENT DOCUMENTS

| | | | |
|---|---|---|---|
| JP | 2005333727 | * | 12/2005 |
| KR | 2001-0064185 | * | 7/2001 |
| KR | 2001-0087597 | * | 9/2001 |
| WO | WO 02/45939 A1 | | 6/2002 |

OTHER PUBLICATIONS

Machine Translation of KR 2001-0087597, "rotary linear motor", Hyeon-Jeong Shin and Jun-Ho Ahn—Sep. 21, 2001.*

Machine Translation of Narita et al., JP 2004-304958, "Permanent Magnet Motor", 2004-304958, Oct. 28, 2004.*

* cited by examiner

PLASTICS INJECTION-MOLDING MACHINE WITH INTEGRATED, LINEAR-ROTARY DIRECT DRIVE

BACKGROUND OF THE INVENTION

The present invention relates to a plastics injection-molding machine with an electrical rotary drive and electrical linear drive.

As a drive, in particular as an injection and metering system, in a plastics injection-molding machine or in similar machine applications, it is necessary to provide a rotary movement and a linear movement on the drive shaft. It must be possible to produce these movements on the one hand independently of one another, or else superimposed.

Until now, a movement such as this with two degrees of freedom has been achieved by the use of two separate, rotary drives. FIG. 1 shows a cross section through one such drive. A threaded spindle 1 is driven via a first spindle nut 2 by a first rotary drive 3 and via a second spindle nut 4 by a second rotary drive 5. The threaded spindle 1 is used to convert the rotary movement to a linear movement. The functional principle can be explained with the aid of FIG. 2, which schematically illustrates the output drive shaft or threaded spindle 1 and the spindle nuts 2, 4. When the spindle nuts 2, 4 are driven in the same direction and at the same rotation speed, this results in a purely rotary movement. If, in contrast, the two rotary drives are driven at the same rotation speed in opposite directions then this leads to a pure linear movement of the threaded spindles. If the rotary drives are operated at different rotation speeds and/or in different rotation directions, this results in a combined rotary-linear movement. This drive has the disadvantage on the one hand of the relatively complicated control system, since the threaded drive mechanism must also be taken into account in the operation of the two rotary motors in order to achieve a linear movement. Furthermore, two motors must always be controlled in synchronism for simple movements. The control loop for the linear drive is also relatively complex. A further major disadvantage is that the threaded drive mechanism as well as the bearings are subject to a relatively large amount of wear. This is because these components have to absorb large axial forces. A further disadvantage is that the entire drive is physically relatively large.

SUMMARY OF THE INVENTION

The object of the present invention is therefore to propose a low-wear and compact drive, which can be controlled easily, for a plastics injection molding machine.

According to the invention, this object is achieved by a plastics injection molding machine having an output drive shaft, an electrical rotary drive and an electrical linear drive, wherein the linear drive has a first electric linear motor with an external rotor in the form of a pot, in whose interior the majority of a hollow-cylindrical stator of the first linear motor is arranged and which is firmly connected to the output drive shaft, and the rotary drive has a rotating electric motor whose stator is arranged in the interior of the hollow-cylindrical stator of the first linear motor and is firmly connected to it, and whose rotor is firmly coupled to the output drive shaft, within the stator of the rotating electric motor.

The linear-rotary direct drive makes it possible to achieve a very low-wear system since there is no threaded drive mechanism and the bearings do not need to absorb any axial forces. Furthermore, the interleaving of the two drives results in an extremely compact design.

In one embodiment, the external rotor can be attached to the output drive shaft at one end via a plate in the form of a pot.

This configuration is particularly suitable for machines in which only a small amount of physical space is available axially.

The output drive shaft can be supported in the interior of the stator of the linear drive by a bearing plate. This measure likewise makes it possible to keep the physical space very short in the axial direction.

In a further embodiment, a second electric linear motor is provided, and is connected in series with the first linear motor. The coaxial arrangement one behind the other allows the mechanical stiffness and the dynamic response of the drive to be increased in comparison to a drive with a single linear motor with the same axial force.

When two electric linear motors are connected one behind the other, the stators of the two linear motors can be connected to one another by a flange arranged between them. This allows the combination drive to be supported advantageously at its axial center.

BRIEF DESCRIPTION OF THE DRAWING

The present invention will be explained in more detail with reference to the attached drawings, in which.

DETAILED DESCRIPTION OF PREFERRED EMBODIMENTS

The exemplary embodiments which will be described in more detail in the following text represent preferred embodiments of the present invention.

Figure 3:
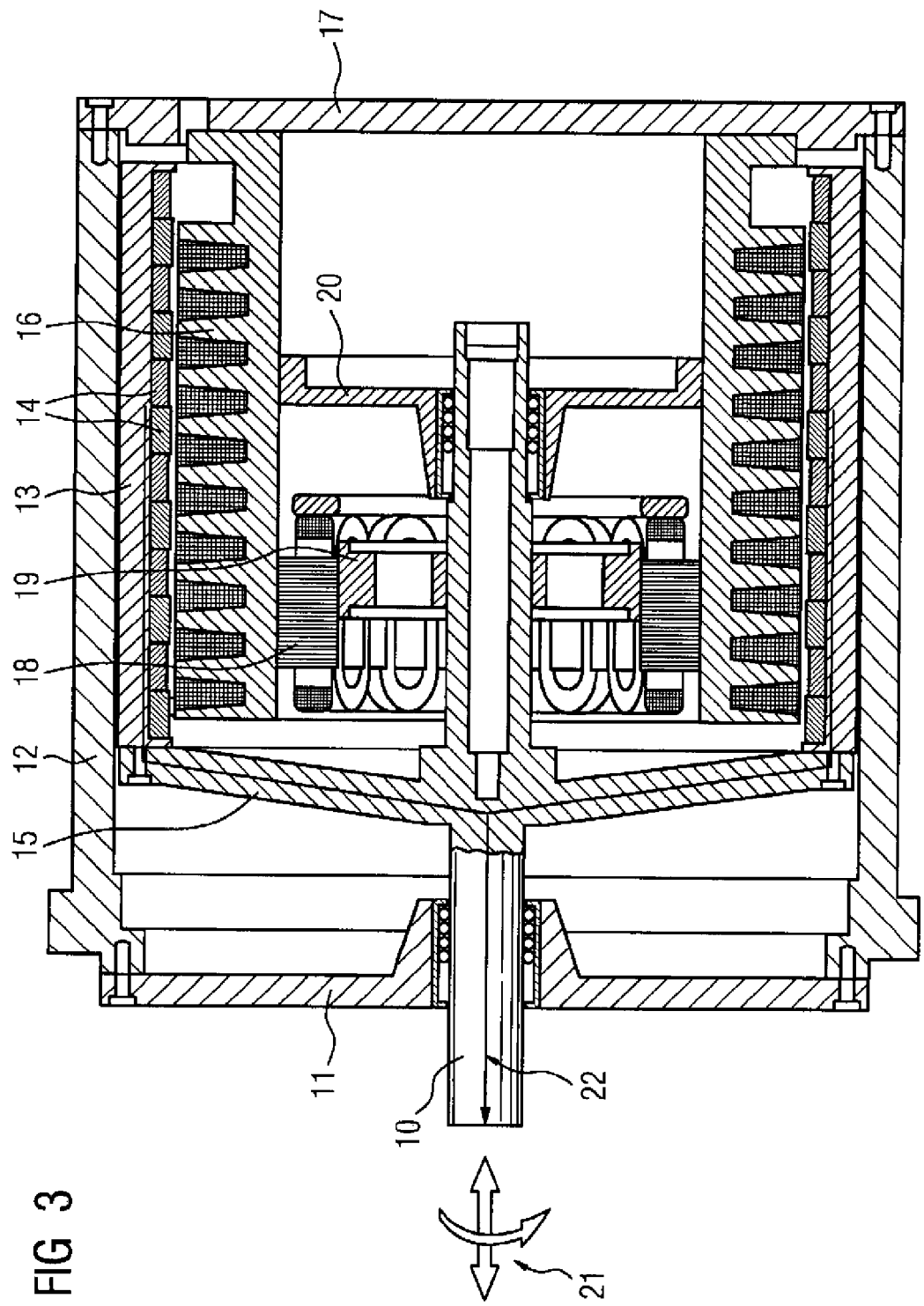
FIG. 3 shows a cross section through an integrated, linear-rotary, electrical direct drive according to the present invention.

The cross section, as shown in FIG. 3, of an integrated, linear-rotary, electrical direct drive has an output drive shaft 10, which is supported on the output drive side on a bearing plate 11 of a housing 12. A structure in the form of a pot is integrally formed rotationally symmetrically on the output drive shaft 10 in the interior of the housing 12, and represents the external rotor 13 of the linear direct drive. Permanent magnets 14 are located on the inner wall of the cylindrical section of the external rotor. A plate 15 in the form of a pot provides the connection between the cylindrical external rotor section 13 and the output drive shaft 10.

A hollow-cylindrical stator 16 of the linear motor is located in the interior of the external rotor 13 and is connected to a cover 17, which is opposite the bearing plate 11 and is screwed to the housing 12. A stator 18 of the rotary direct drive is attached to the inner wall of the hollow-cylindrical stator 16 of the linear motor. FIG. 3 shows some of the windings and a part of the laminated core of the stator 18. The rotor 19 of the rotary direct drive runs within the stator 18 and is mounted on the output drive shaft 10. A bearing plate 20 on which the input drive side of the shaft 10 is supported is also located in the interior of the stator 16 of the linear drive.

The superimposed movement which can be achieved by the combination drive is indicated by the double-headed arrows 21 in FIG. 3. The linear movement of the output drive shaft 10 can be achieved by the sketched power flow 22, which runs from the external rotor 13 via the plate 15 in the form of a pot to the output drive shaft 10.

The advantages of this combination drive are its compact design, which is achieved by the rotary motor being mounted with its stator 18 on the inner wall of the linear motor stator 16, and coaxially with it. This arrangement also allows heat to be dissipated jointly from the rotary stator and linear stator.

In this arrangement, the linear motor is in the form of an external rotor motor, with the external rotor being rigidly connected to the shaft and rotating at the same rotation speed as the rotating rotor. The provision of a rigid connection between the external rotor 13 and the output drive shaft 10 makes it possible to achieve high linear positioning accuracies.

Figure 1:
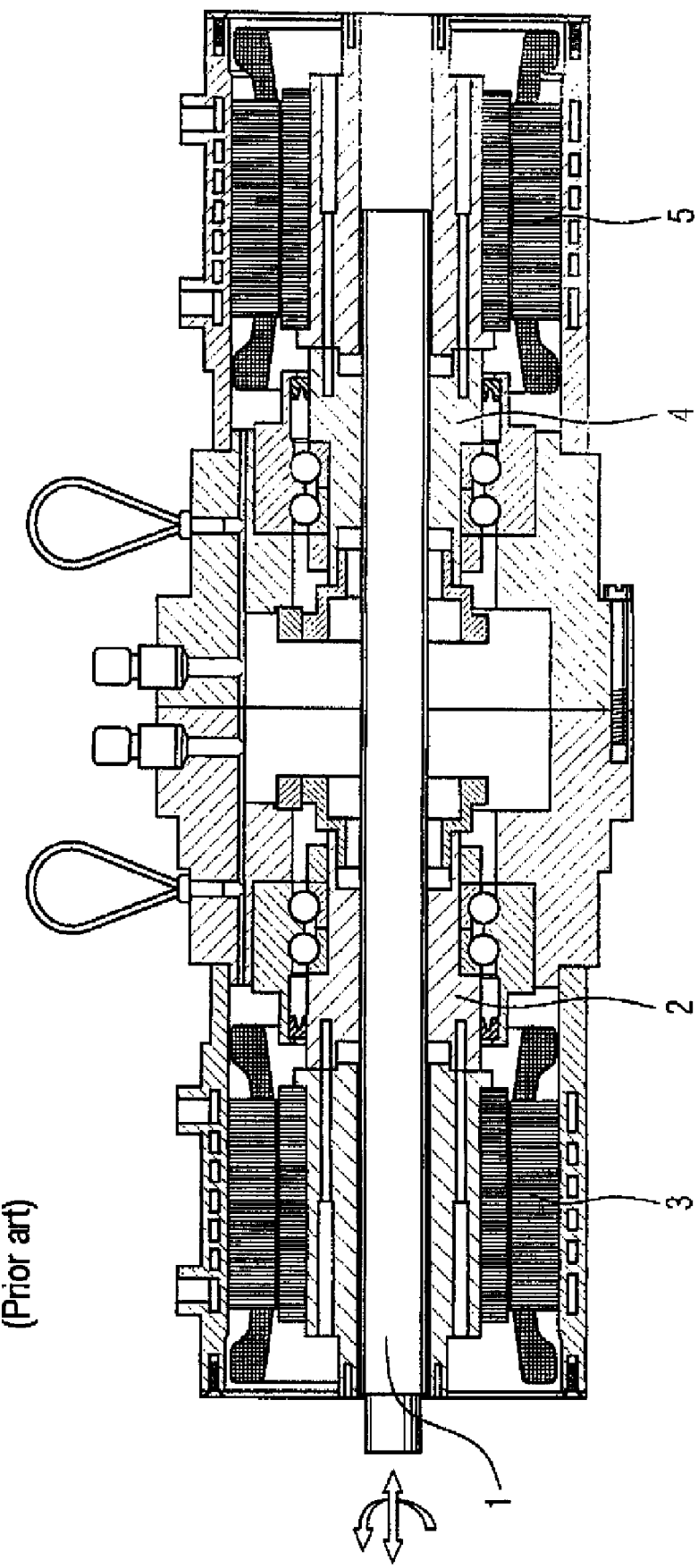
FIG. 1 shows a cross section through an injection/metering system according to the prior art.
Figure 2:
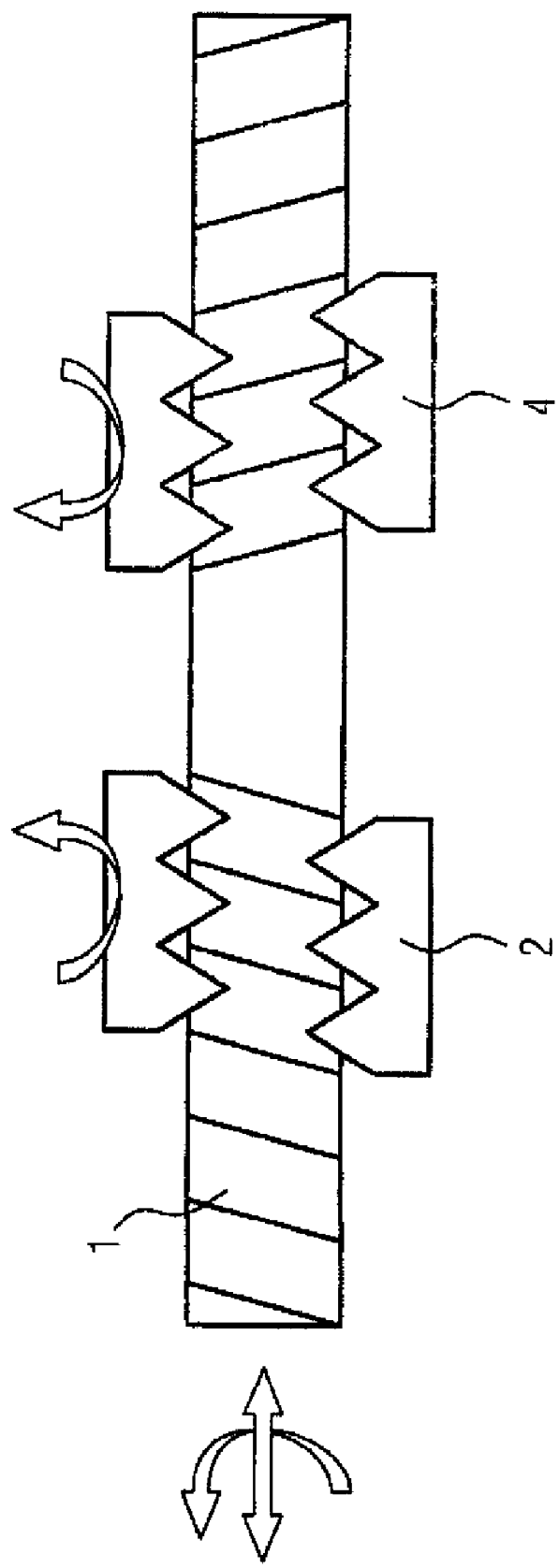
FIG. 2 shows an outline sketch of the method of operation of the injection/metering system shown in FIG. 1.

Further advantages of the integrated direct drive according to the invention are that it avoids the need for a costly drive combination comprising bearings and a threaded drive mechanism as used when the rotary drive movement is in the form of a combined linear-rotary feed movement (see FIGS. 1 and 2). This leads to cost savings and, as a result of the reduction in costly bought-in items, to better electromechanical cost-effectiveness and improvement in the performance of the overall drive. Furthermore, the drive system can be controlled considerably more easily since the moments of the individual drives can be produced directly and can easily be tapped off for control purposes. Furthermore, the integrated, linear-rotary direct drive avoids the need for mechanical components that are subject to wear, such as axial bearings and a threaded drive mechanism. This results in the drive having a longer life.

Figure 4:
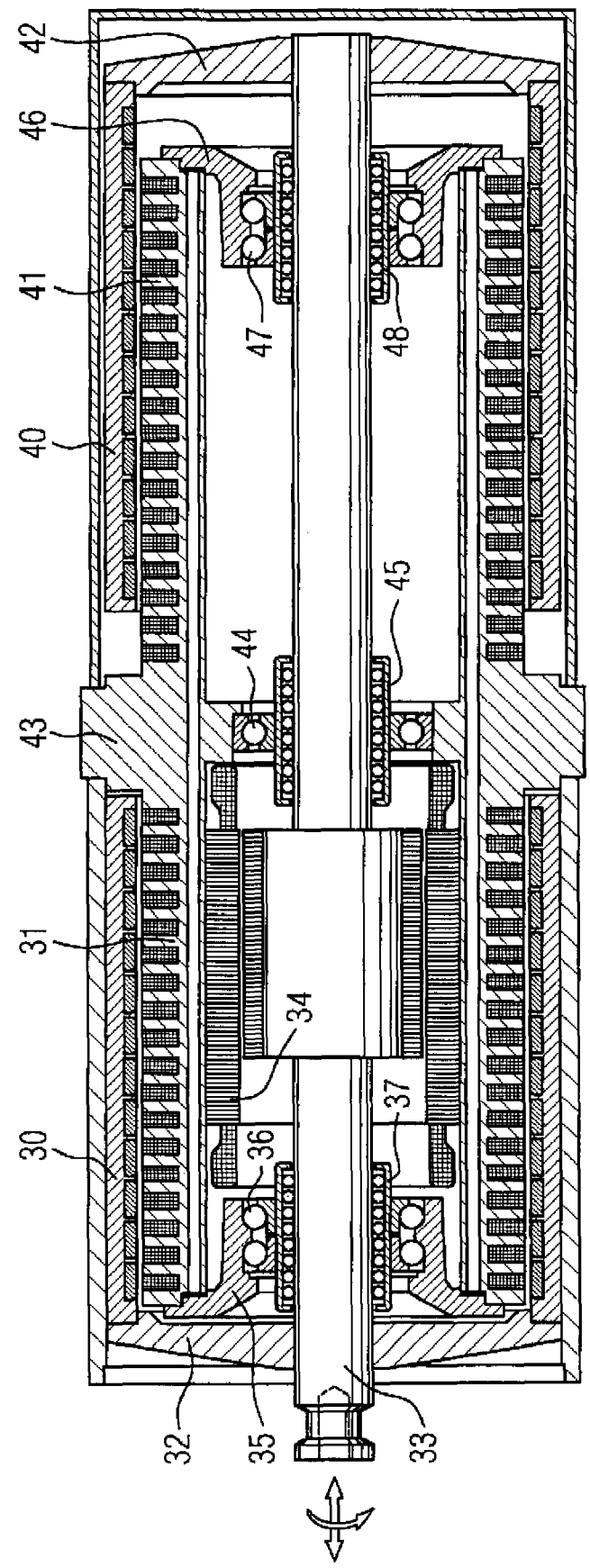
FIG. 4 shows a cross section through an integrated, linear-rotary, electrical direct drive with two series-connected linear motors according to the present invention.

FIG. 4 shows a cross section through a further drive for an injection molding machine according to the invention. The configuration of this drive corresponds, in the left-hand half, essentially to that shown in FIG. 3. This means that the external rotor 30 of the linear motor is in the form of a pot, and surrounds the hollow-cylindrical stator 31 of the linear motor. A plate 32 in the form of a pot provides the connection between the external rotor 30 and the output drive shaft 33. The stator 34 of the rotary motor is mounted on the inside of the stator 31 of the linear motor. A bearing plate 35, with whose aid the output drive shaft 33 is mounted on the stator 31, is provided on the output drive side, close to the plate 32, in the form of a pot, in the interior of the stator 31 of the linear motor. A ball bearing 36 is used to provide the support for the rotary movement, and a ball socket 37 is used to provide the support for the linear movement. The ball socket allows unrestricted linear movement along the shaft 33. The bearings 36 and 37 therefore do not absorb any axial forces.

A second linear motor is located in a mirror-image form with respect to the described first linear motor on an axial extension of it. The second linear motor comprising the external rotor 40, the stator 41 and the second plate 42 in the form of a pot likewise drives the shaft 33.

In the chosen example, the second stator 41 is formed integrally with the first stator 31, with a flange 43 being formed between the two stators. The entire drive can be supported on this flange 43. In the area of the flange 43, the shaft is likewise supported by a ball bearing 44 and a ball socket 45. At the other end, in the area of the second plate 42 in the form of a pot, the shaft 43 is supported within the stator 41 by means of a further bearing plate 46 with the aid of a ball bearing 47 and a further ball socket 48.

Two linear motors are therefore connected in series in the drive according to the embodiment shown in FIG. 4. This connection one behind the other allows higher axial forces to be achieved. In order to allow the same axial forces to be achieved with a drive according to the example shown in FIG. 3, this would have to have a larger external rotor area, that is to say it would have to have a larger diameter for a predetermined length. However, this would reduce the mechanical stiffness of the drive. Furthermore, the increase in the diameter would increase the inertia of the rotor, so that the dynamic response of the drive would fall. This means that the connection of two linear motors with a smaller diameter in series leads to higher mechanical stiffness and to a better dynamic response of the drive.

What is claimed is:

1. A plastics injection molding machine, comprising:
   an output drive shaft;
   an electrical linear drive having a first electric linear motor which includes an external rotor in the form of a pot having an interior and firmly connected to the output drive shaft, and a hollow-cylindrical stator arranged in part in the interior of the first linear motor, said hollow-cylindrical stator having an interior and defining opposite axial ends;
   an electrical rotary drive having a rotary electric motor which includes a stator with a core and winding arranged entirely in the interior of the hollow-cylindrical stator of the first linear motor and firmly connected thereto, and a rotor which is firmly coupled to the output drive shaft within the stator of the rotary electric motor; and
   a bearing plate positioned entirely within the interior of the stator of the linear drive away from the axial ends for axial and radial support of the output drive shaft.

2. The plastics injection molding machine of claim 1, further comprising a plate in the form of a pot for attaching one end of the external rotor to the output drive shaft.

3. The plastics injection molding machine of claim 1, wherein the linear drive has a second electric linear motor connected in series with the first linear motor.

4. The plastics injection molding machine of claim 3, wherein the second electric linear motor has a stator, and further comprising a flange arranged between the stators of the first and second linear motors for interconnecting the stators of the first and second linear motors, said output drive shaft being supported in an area of the flange.

* * * * *